(12) United States Patent
Schwalenberg et al.

(10) Patent No.: US 8,353,359 B2
(45) Date of Patent: Jan. 15, 2013

(54) APPARATUS AND METHOD FOR ATTACHING A UTILITY VEHICLE 3-POINT HITCH TO AN IMPLEMENT BRACKET

(75) Inventors: Terry Ray Schwalenberg, Hilbert, WI (US); Eric James Muehlbauer, Kiel, WI (US)

(73) Assignee: Amerequip Corporation, Kiel, WI (US)

( * ) Notice: Subject to any disclaimer, the term of this patent is extended or adjusted under 35 U.S.C. 154(b) by 0 days.

(21) Appl. No.: 13/268,310

(22) Filed: Oct. 7, 2011

(65) Prior Publication Data

US 2012/0085559 A1    Apr. 12, 2012

Related U.S. Application Data

(60) Provisional application No. 61/391,284, filed on Oct. 8, 2010.

(51) Int. Cl.
*A01B 59/06* (2006.01)
*A01B 59/043* (2006.01)
*A01B 63/02* (2006.01)
*A01B 63/118* (2006.01)

(52) U.S. Cl. ........................................ 172/439; 414/686

(58) Field of Classification Search .................. 414/686, 414/694, 722, 723; 172/272, 439, 274, 5, 172/450, 443, 447; 180/312, 377; 280/760; 296/203.01
See application file for complete search history.

(56) References Cited

U.S. PATENT DOCUMENTS

| | | | |
|---|---|---|---|
| 3,847,228 A * | 11/1974 | Slosiarek et al. | 172/450 |
| 3,871,463 A | 3/1975 | Geisthoff | |
| 3,904,051 A | 9/1975 | Tsuchiya et al. | |
| 3,966,065 A | 6/1976 | Jones | |
| 4,043,470 A | 8/1977 | Pilch | |
| 4,163,627 A | 8/1979 | Schnittjer et al. | |
| 4,355,945 A * | 10/1982 | Pilch | 414/686 |
| 4,519,623 A * | 5/1985 | Orthman | 172/439 |
| 4,944,649 A * | 7/1990 | Stralow | 414/686 |
| 4,986,722 A | 1/1991 | Kaczmarczyk et al. | |
| 5,029,650 A | 7/1991 | Smit | |
| 5,098,252 A | 3/1992 | Sheesley et al. | |
| 5,303,790 A | 4/1994 | Coleman | |
| 5,540,289 A | 7/1996 | Hirooka et al. | |
| 5,544,708 A | 8/1996 | Braun | |
| 5,546,683 A | 8/1996 | Clark | |
| 5,692,855 A | 12/1997 | Burton | |
| 6,062,319 A * | 5/2000 | Schwalenberg et al. | 172/272 |
| 7,377,330 B2 * | 5/2008 | Mickelson et al. | 172/450 |
| 7,874,391 B2 * | 1/2011 | Dahl et al. | 180/89.12 |
| 2001/0022226 A1 * | 9/2001 | Staude | 172/439 |
| 2006/0016611 A1 * | 1/2006 | Chauvel | 172/439 |
| 2008/0035356 A1 * | 2/2008 | Dahl et al. | 172/439 |
| 2009/0121521 A1 * | 5/2009 | Sakamoto et al. | 296/203.01 |

FOREIGN PATENT DOCUMENTS

| | | |
|---|---|---|
| JP | 09324440 | 12/1997 |
| JP | 09324440 A * | 12/1997 |

* cited by examiner

*Primary Examiner* — Arpad Fabian-Kovacs
(74) *Attorney, Agent, or Firm* — Andrew C. Landsman; Godfrey & Kahn, S.C.

(57) ABSTRACT

A connecting apparatus and method of using the apparatus provide for attaching an implement to a utility vehicle that has a 3-point hitch including lower lift arms and connecting arms attached to rockshaft arms. The attachment apparatus and corresponding method include a lift support attached to the lower lift arms of the 3-point hitch. This combination of the lift support and lower lift arms provides for the hydraulic positioning of the implement, so that the implement (and/or brackets attached to the implement) may be attached to the utility vehicle (and/or brackets attached to the utility vehicle) without removing the lower lift arms and connecting arms.

6 Claims, 7 Drawing Sheets

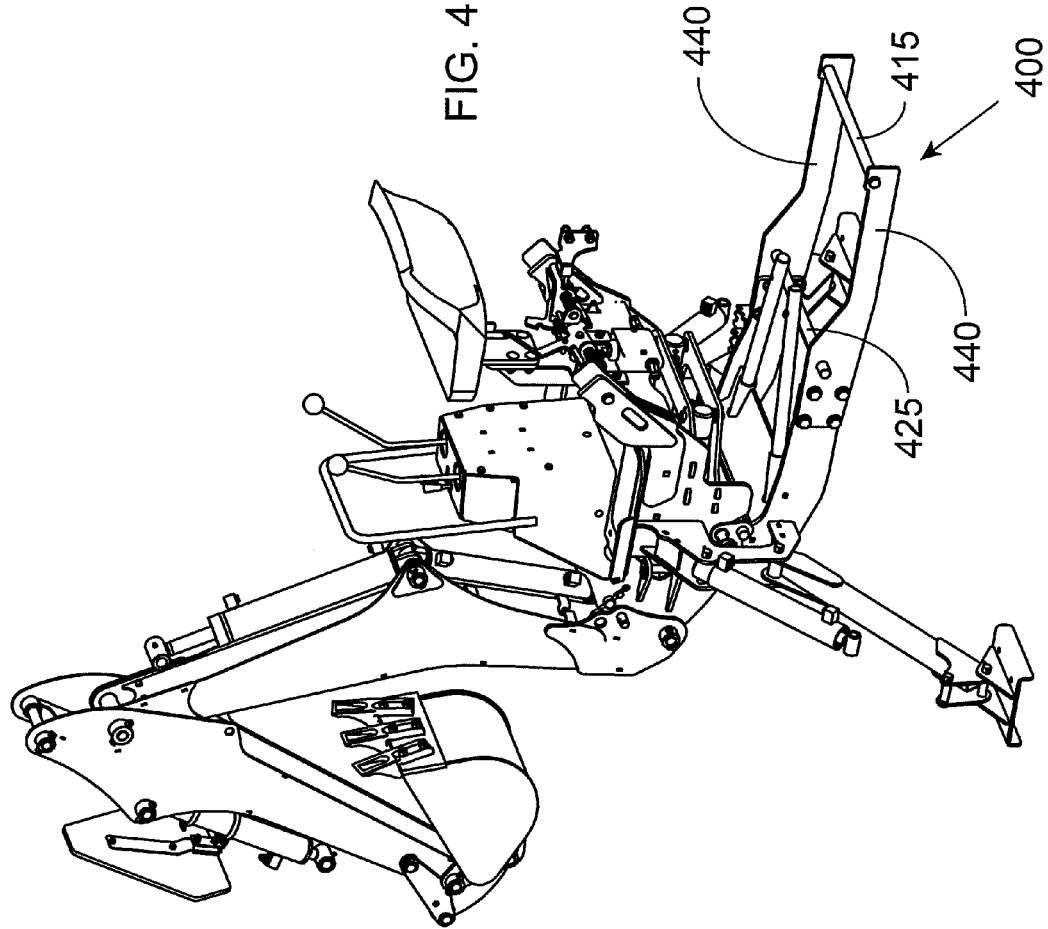

APPARATUS AND METHOD FOR ATTACHING A UTILITY VEHICLE 3-POINT HITCH TO AN IMPLEMENT BRACKET

PRIORITY CLAIM

This application claims the benefit of U.S. Provisional Patent Application No. 61/391,284 filed on Oct. 8, 2010 which is hereby incorporated in its entirety for all purposes.

FIELD OF THE INVENTION

The present invention relates generally to the field of utility vehicles. More particularly, the present invention relates to an attachment apparatus and method of using the apparatus for attaching implements to a utility vehicle.

BACKGROUND

People use utility vehicles for many purposes. Implements are often attached to the back or front of such utility vehicles to accomplish work. For example, utility vehicles may be used to pull implements including plows (to turn over the upper layer of soil), harrows (for breaking up clumps and clods of dirt), seed drills (for introducing seed to the soil), and sprayers (for introducing liquid herbicides, insecticides, or other chemicals). In many cases, workers attach such implements to the back of the utility vehicle using a 3-point hitch. (The term "utility vehicle" as used herein shall include, without limitation, tractors, ATVs, UTVs, trucks, and other similar vehicles.)

A 3-point hitch, which is a conventional component on many utility vehicles provides a way of attaching implements to the back of the vehicle. A 3-point hitch includes three movable arms: two lower lift arms and a single upper arm, known as the top link. When each of these three arms is attached to an implement, the terminal ends of the arms may be thought of as defining the three vertices of an upright triangle, or letter "A" (viewed by an observer facing the back of the utility vehicle). Furthermore, the lower lift arms are typically operable hydraulically, allowing a worker using a utility vehicle to pull an implement to adjust the height of the implement relative to the ground. Hydraulic operation is typically achieved by attaching the lower lift arms of the 3-point hitch—using connectors known as lift links—to hydraulically driven rockshaft arms. The operator actuates a control that hydraulically raises the rockshaft arms; which in turn raises the lower lift arms of the 3-point hitch—by virtue of the fact that the rockshaft arms are connected to the lower lift arms via the aforementioned lift links; which in turn raises the implement (or portion thereof) to which the 3-point hitch is attached.

As should be apparent, a 3-point hitch is a useful way to join many kinds of pull-behind implements to a utility vehicle. This is especially true when the implement is to be raised (with the force supplied by the hydraulic system of utility vehicle) and lowered (with the force supplied by gravity) during use. For example, a utility vehicle pulling a plow that is attached using a 3-point hitch can be raised and lowered as the utility vehicle goes forward. In this way the operator of the utility vehicle can lower the plow to dig more deeply into the soil, or raise the plow to dig less deeply into the soil. Raising and lowering the implement, in this case a plow, affects the soil depth at which the implement operates and, therefore, the load on the utility vehicle. Because of its utility, a 3-point hitch has become a standardized piece of equipment on many utility vehicles. Similarly, many implements are adapted to connect to a utility vehicle using a 3-point hitch.

For some implements, however, a 3-point hitch may not be as useful, or optimal, for connecting the implement to a utility vehicle. Backhoes, for example, are used for digging. The digging motion of a backhoe can generate significant forces on the backhoe itself, and any utility vehicle to which the backhoe is attached. Unlike a pull-behind implement, which benefits from some flexibility in lateral and vertical movement during operation of the implement, a backhoe performs better if it is more rigidly attached to a utility vehicle. Accordingly, a user attaching a backhoe to a utility vehicle typically has two options: (1) remove the 3-point hitch (or move parts of the 3-point hitch, such as the lower lift arms, out of the way, and keep them out of the way, because they will not be used to attach the backhoe or other equipment to the utility vehicle), which is generally designed for a somewhat mobile and flexible connection to a pull-behind implement; or (2) modify the 3-point hitch to increase its rigidity when connecting an implement like a backhoe to the utility vehicle.

A user choosing option (1) above must remove the 3-point hitch, or parts thereof (e.g. the lower lift arms), before attaching the backhoe or other implement to the back of the utility vehicle—using, of course, another connection device to attach the backhoe. Or parts of the 3-point hitch, such as the lower lift arms, must be moved and kept out of the way, because they are not used when connecting the implement to the utility vehicle. If a user goes back and forth between operating the utility vehicle with pull-behind implements and operating the utility vehicle with other implements, then the user must also go back and forth between mounting the 3-point hitch (when attaching implements that make use of the hitch); and removing the 3-point hitch, or parts thereof (when attaching equipment such as a backhoe)—or moving and keeping parts of the 3-point hitch out of the way. This is time consuming, and inefficient.

For example, one method of attaching an implement such as a backhoe to a utility vehicle involves attaching the implement directly to the frame of the utility vehicle (typically denominated as a "subframe installation"). As discussed above, the 3-point hitch, or parts thereof (e.g., the lower lift arms), are removed. The utility vehicle is then positioned proximate to the backhoe, typically by backing up the utility vehicle so that it is near the backhoe, and the hydraulic hoses of the backhoe are then connected to the utility vehicle. The hydraulic system of the utility vehicle is then used to power the backhoe, enabling an operator to use the backhoe's controls to raise and/or lower and/or level the backhoe (e.g., by rotating the backhoe; or by adjusting the stabilizers of the backhoe) so that the backhoe is generally aligned with portions of the utility vehicle frame (specifically, the backhoe and utility vehicle are aligned such that the backhoe and/or utility vehicle may be moved so that the backhoe engages a utility vehicle mount adapted to connect to the backhoe). Generally an operator adjusting the position of the backhoe does so while standing on the ground next to the backhoe while manipulating the backhoe's controls. After the operator has aligned the utility vehicle relative to the backhoe in this manner, the utility vehicle and/or backhoe are moved so that the backhoe engages the utility vehicle mount adapted to connect to the backhoe. The backhoe is then securely connected via the utility vehicle mount to the utility vehicle, typically by inserting pins, bolts, retainers, or other such connectors.

Another method for attaching a backhoe to a utility vehicle, typically denominated as a "four point installation," includes steps like those presented in the previous paragraph. First, the 3-point hitch, or parts thereof (e.g., the lower lift arms), are removed. Next the utility vehicle is positioned proximate to the backhoe, typically by backing up the utility vehicle so that it is near the backhoe, and the hydraulic hoses of the backhoe are then connected to the utility vehicle. The hydraulic system of the utility vehicle is then used to power the backhoe, enabling an operator to use the backhoe's controls to raise and/or lower and/or level the backhoe (e.g., by rotating the backhoe; or by adjusting the stabilizers of the backhoe) so that the backhoe is generally aligned with portions of the utility vehicle frame (specifically, the backhoe and utility vehicle are aligned such that the backhoe and/or utility vehicle may be moved so that the backhoe engages the utility vehicle frame/mount). Generally an operator adjusting the position of the backhoe does so while standing on the ground next to the backhoe while manipulating the backhoe's controls. After the operator has aligned the utility vehicle relative to the backhoe in this manner, the utility vehicle and/or backhoe are moved so that the backhoe engages the utility vehicle frame, which is adapted to connect to the backhoe. The backhoe is then securely connected via the utility vehicle mount to the utility vehicle, typically by inserting pins, bolts, retainers, or other such connectors.

A user choosing option (2), rather than removing the 3-point hitch, typically modifies the 3-point hitch to stabilize the three arms. For example, the upper link of a conventional 3-point hitch may be replaced by a longer adjustable bar that is attached to upper metal braces on either side of the bar. The upper metal braces attach to the adjustable bar and to the utility vehicle or utility vehicle. This combination of an upper adjustable bar with upper metal braces serves as one attachment between the utility vehicle and the backhoe. This upper attachment is further stabilized by connecting additional metal links between this upper combination and either the lower lift arms of the 3-point hitch or a lower portion of the frame of the backhoe itself. The lower lift arms of the 3-point hitch may also be connected directly to a lower portion of the frame of the backhoe. As discussed above, this way of attaching a backhoe works. But it takes time to modify the hitch and connect it to the backhoe. And because the 3-point hitch is designed to provide a flexible connection to pull-behind implements—e.g., ball-and-socket joints are typically employed at both ends of the 3 arms of the 3-point hitch to provide such flexibility and accommodate up-and-down and lateral movement of the implement as it is pulled—even this stabilized 3-point hitch allows some back-and-forth and up-and-down movement during operation of the backhoe. Also, the method of connecting a stabilized 3-point hitch to an implement typically requires that the hydraulic hoses of the backhoe first be connected to the utility vehicle's hydraulic system (so that the hydraulic system of the utility vehicle may be used to power the backhoe and allow an operator to use the backhoe's controls to adjust the backhoe's orientation relative to the utility vehicle). Similar to the four-point and sub-frame installation methods described above, this step is typically required in order to raise and/or lower and/or align the backhoe prior to securely attaching the backhoe to the utility vehicle (in this last case using the stabilized 3-point hitch).

SUMMARY

The connecting apparatus and method of using the apparatus disclosed herein provides for safely and easily attaching an implement requiring a stabilized connection to a utility vehicle. The connecting apparatus eliminates the need to remove the lower lift arms of a 3-point hitch, move parts of the 3-point hitch out of the way and keep them out of the way, or convert a 3-point hitch, as described above, into a stabilized hitch. Furthermore, the connecting apparatus exploits the hydraulic feature common to 3-point hitches. A lift support is attached to the lower lift arms of the 3-point hitch. This combination of the lift support and lower lift arms provides for the hydraulic positioning of the implement, so that the implement (and/or brackets attached to the implement) may be attached to the utility vehicle (and/or brackets attached to the utility vehicle), thus providing for a more secure and rigid attachment. Once the combination of the lift support and lower lift arms of the 3-point hitch have been used to raise the implement into position so that the implement is secured to the utility vehicle, hydraulic operation of these lower lift arms is no longer needed (unlike use of a 3-point hitch with pull-behind implements, as discussed above). Also, because hydraulic operation of the lower lift arms and lift support is used to position the utility vehicle and implement relative to each other so that they can be securely attached to one other, the step of connecting hydraulic hoses of the implement to the hydraulic system of the utility vehicle (so that the utility vehicle's hydraulic system may be used to power the implement such that the implement's controls are used to raise and/or lower and/or level the implement to align it with the utility vehicle frame prior to securely attaching the two together) is typically avoided (until an operator wishes to operate the securely attached implement, in which case the utility vehicle's hydraulic system is generally used to power operation of the backhoe).

Some or all of the connecting apparatus may be employed in the original design of a utility vehicle, implement (or other equipment), or a part or component of thereof. The connecting apparatus may also include components that are attached to an existing utility vehicle, implement (or other equipment), or a part thereof.

One embodiment of the present invention is a connection apparatus for a utility vehicle having a 3-point hitch. The connection apparatus includes: a utility vehicle bracket, with the utility vehicle bracket being adapted to attach to the rearward portion of the utility vehicle; an implement bracket, the implement bracket adapted to attach to an implement; and a lift support adapted to attach to the lower lift arms of the 3-point hitch, wherein the combination of the lift support and lower lift arms is adapted to position the implement so that the utility vehicle bracket can be attached to the implement bracket. These brackets, then, provide for a secure attachment between the implement and the utility vehicle without removing the lower lift arms of the 3-point hitch (and, in fact, make use of the combination of the lifts support and lower lift arms to position the implement/implement bracket for secure attachment to the utility vehicle/utility vehicle bracket).

An alternative embodiment of the present invention is a utility vehicle that includes a 3-point hitch having lower lift arms; and a lift support attached to the lower lift arms of the 3-point hitch. The combination of the lift support and lower lift arms is adapted to position an implement before securely attaching the implement to the utility vehicle by connectors or attachment components other than the 3-point hitch.

The present invention also encompasses methods of attaching an implement, such as a backhoe, log splitter, spreader box, or other equipment that may require a more rigid attachment to a utility vehicle than is available using a 3-point hitch alone.

One method of connecting an implement to a utility vehicle in accordance with the present invention includes the steps of: attaching a utility vehicle bracket to a utility vehicle, the utility vehicle bracket adapted to attach to an implement bracket; attaching an implement bracket to the piece of implement; and attaching a lift support to the lower lift arms of a 3-point hitch, the combination of the lift support and lower lift arms being adapted to position the equipment so that the utility vehicle brackets may be attached to the implement brackets. The method may also include one or both of the steps of lifting the implement with the combination of the lift support and lower-lift arms of the 3-point hitch; and the step of connecting the utility vehicle bracket to the implement bracket.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 4 is a side view of the attachment apparatus of FIG. 3 before an implement is attached to a utility vehicle.

DETAILED DESCRIPTION

Figure 1:
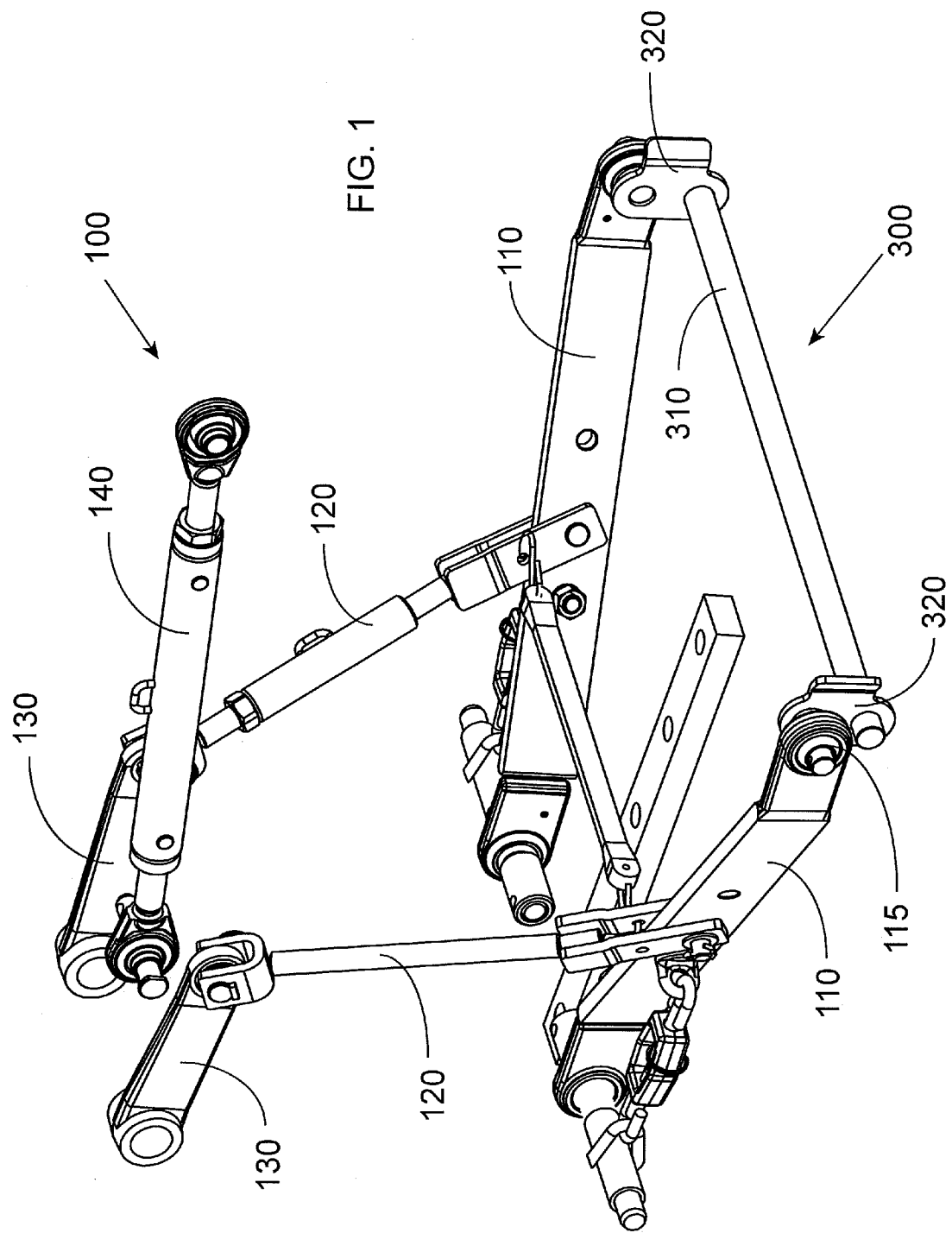
FIG. 1 is a perspective of one version of a three-point hitch.
Figure 2:
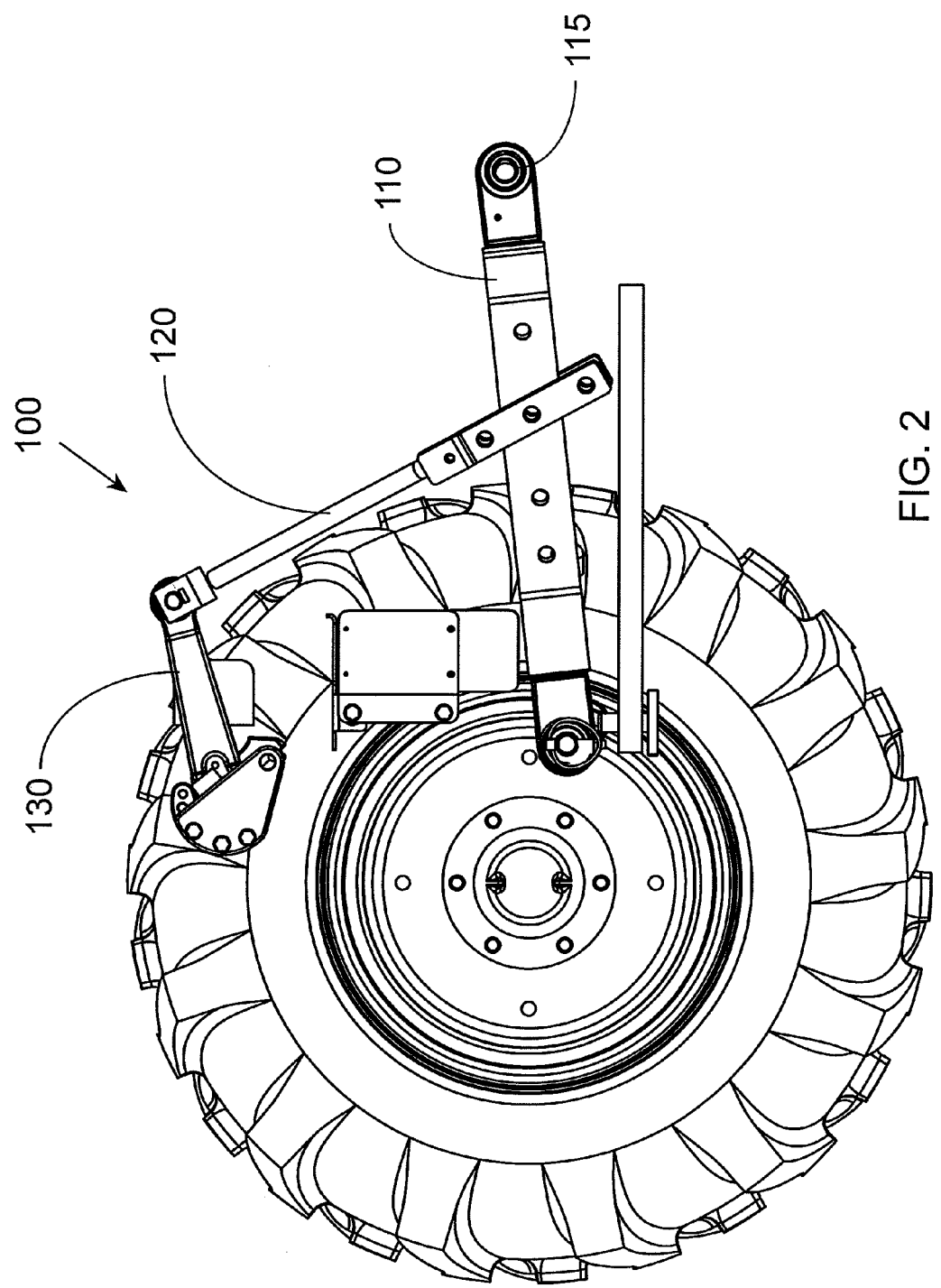
FIG. 2 is a side view the three-point hitch of FIG. 1 positioned at the rear of a utility vehicle.

FIGS. 1 and 2 show one version of a 3-point hitch 100 positioned at the rear of a utility vehicle (not shown except for the tire and a portion of the axle location in FIG. 2). To facilitate viewing of the illustrative embodiments of the invention, only certain portions of the utility vehicle and corresponding hitch are shown in the Figures. A pair of lower lift arms 110 extend rearwardly outwardly from the utility vehicle. The lower lift arms 110 are connected to a pair of connecting arms 120, which in turn are connected to rock-shaft arms 130. Each of these assemblies—i.e., a lower lift arm 110 connected to a rockshaft arm 130 by a connecting arm 120—is located on either side of, and equidistant from, a vertical plane passing through an imaginary longitudinal center line that bisects the utility vehicle from front to back. The third point of the 3-point hitch is the upper connecting arm or "top link" 140. The upper top link 140 is located above and in-between the lower lift arms 110 and is typically adjustable to accommodate implements of different sizes.

The 3-point hitch 100 is typically designed, and used with, pull-behind implements that move side-to-side, and up-and-down, during use. Accordingly, the arms 110, 140 of a 3-point hitch typically terminate in ball joints that help accommodate such up-and-down and side-to-side movement of the pull-behind implement. While a 3-point hitch may be stabilized somewhat to attach an implement other than pull-behind implements, the 3-point hitch, so modified, still provides a connection that allows some movement that the hitch is designed to accommodate.

Also shown in FIG. 1 is a lift support 300. The lift support 300 may be a single assembly attached to both of the lower lift arms 110. For example, a single, substantially horizontal tube or rod 310 may be attached to both of the lower lift arms 110, with one end of the tube or rod 310 connected to the terminal end of one of the lower lift arms 110; and with the other, opposing end of the tube or rod connected to the terminal end of the other lower lift arm 110. Another possible configuration employs a tube or rod encased in a rotatable sleeve (not shown). That is, the sleeve is configured so that it can rotate around the tube or rod, with the ends of the tube or rod connected to the lower lift arms 110.

Alternatively, the lift support 300 may include two separate assemblies (not shown), one at each terminal end of each of the two lower lift arms 115. For example, an assembly including a boss may be attached to the terminal end of a lower lift arm 115, one assembly for each arm. These bosses, then, are adapted to insert into a reciprocal recess or opening on the corresponding implement bracket 400 of FIG. 3B, thereby providing for the hydraulic positioning of the implement prior to secure connection to the utility vehicle. That is, the bosses allow for the implement to be supported and lifted or otherwise moved by the action of the lower lift arms 110 (typically, as described above, by virtue of the lower lift arms 110 being connected via connecting arms 120 to hydraulically powered rock-shaft arms 130).

Generally, then, the lift support 300 will comprise a configuration that includes a horizontal component, with the horizontal component adapted to engage some portion of the implement bracket 400, thereby providing for the ability to support and lift or position the implement through hydraulic operation of the lower lift arms 110 of the 3-point hitch 100.

It should be noted, too, that the lift support 300 is typically capable of accommodating curvilinear or rotational motion about two different centers. One center, as discussed herein, is a pivot point or pivot axis around which the implement bracket moves or rotates when lifted into position before the implement bracket 400 is attached to the utility vehicle bracket 200. Typically this center/pivot point is a location on the utility vehicle bracket 200 where the implement bracket 400 engages the utility vehicle bracket 200. The second center is the location around which the lower lift arms of the 3-point hitch 100 move when hydraulically raised (or, by action of gravity, lowered). The combination of the lower lift arms 110 and lift support 300 engage the implement bracket 400 at a location different from the first center, and lift or move the implement bracket 400 (and equipment to which the implement bracket 400 is attached). Thus the movement of the implement bracket 400 is about two centers: the aforementioned pivot point, typically at a location where the implement bracket 400 engages the utility bracket 200; and the location about which the lower lift arms 110 move.

One configuration adapted to accommodate the motion of the implement bracket 400 about two centers is a trapeze-like lift support 300. Rather than directly connect the terminal ends of the lower lift arms 115 to a rigid tube 310, the rigid tube 310 is suspended from the terminal ends 115 by two hanging connectors 320 capable of rotating or swinging about said terminal ends of the lower lift arm 115. In this way, the implement bracket 400, when moved upward by virtue of engagement with the rigid tube 310 suspended from the terminal ends of the lower lift arms 115, can be positioned for secure attachment to the utility vehicle bracket 200. Other configurations may be used, as is discussed below.

Figure 3A:
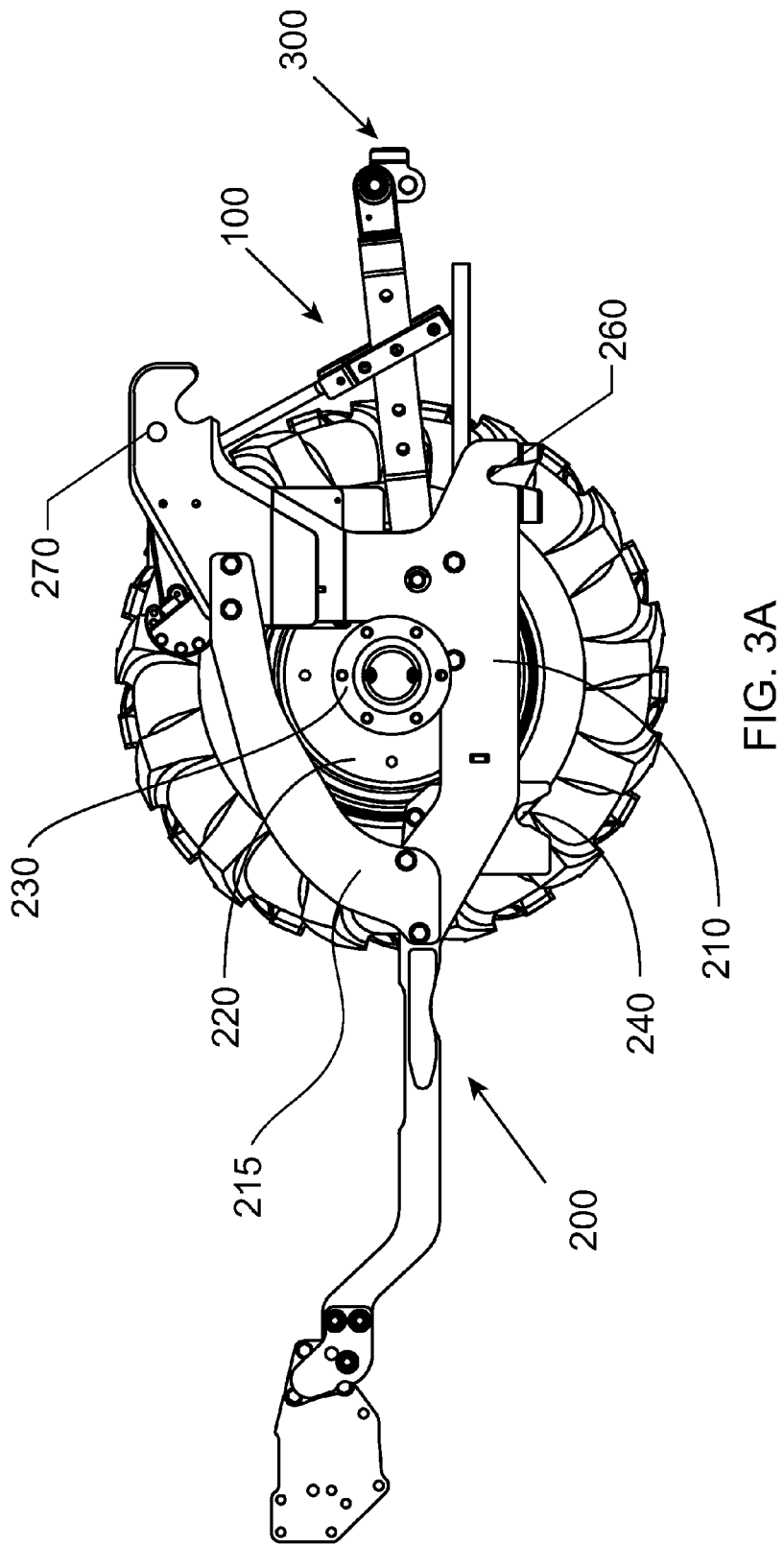
FIGS. 3A and 3B are side views of an attachment apparatus in accordance with the present invention.
Figure 3B:
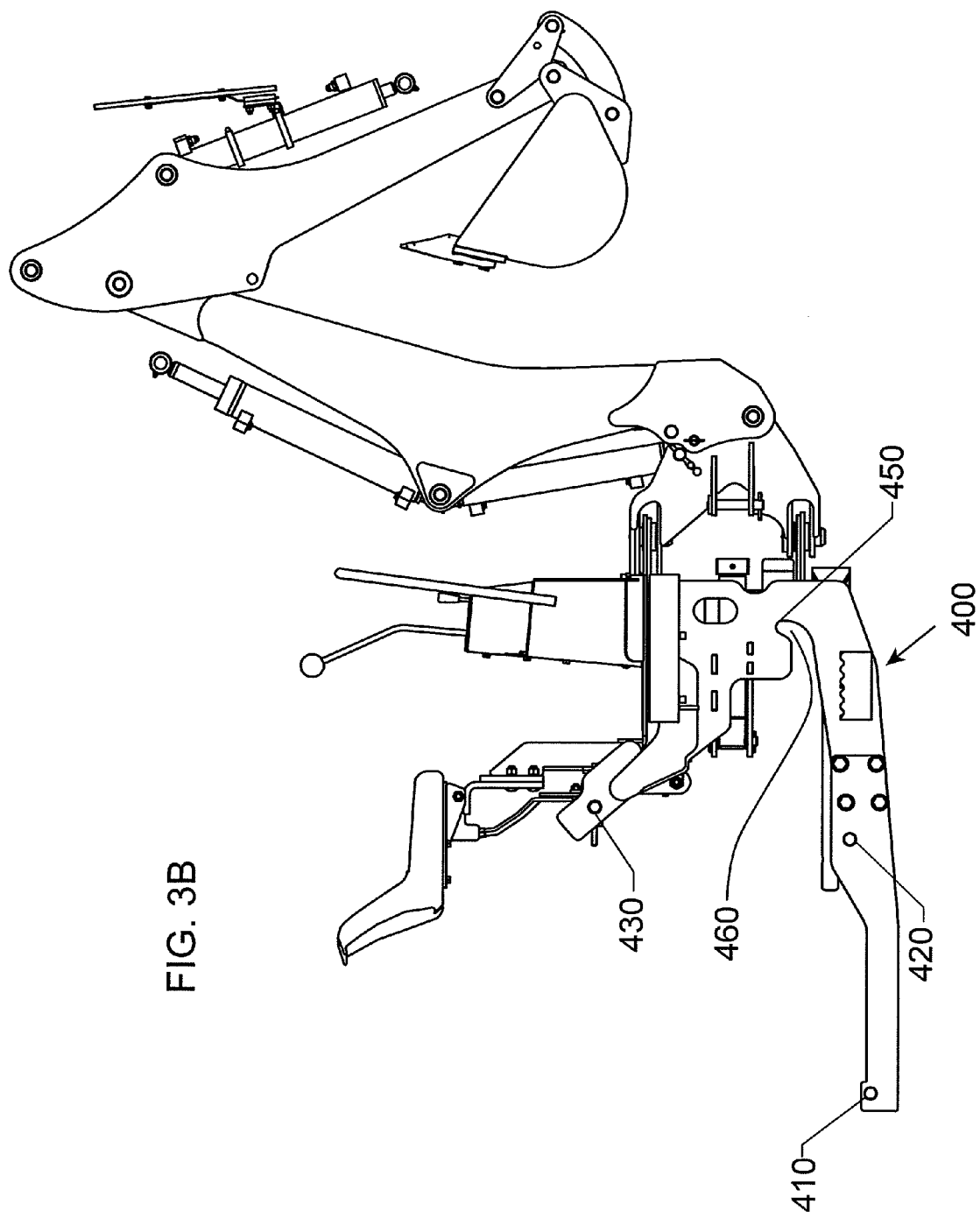

FIGS. 3A and 3B show different parts of one embodiment of an attachment apparatus 200 in accordance with the present invention. FIG. 3A shows a utility vehicle bracket 200 and lift support 300; and FIG. 3B shows an implement bracket 400. A utility vehicle bracket 200 may be unitary—i.e., a single bracket—or it may include separate pieces—e.g., two separate side brackets, with each side bracket attached to an opposing side of the utility vehicle. As shown in FIG. 3A, utility vehicle bracket 200 includes two separate side brackets 210, but only one is shown. The utility vehicle bracket 200 may assume shapes, sizes, and configurations different from that depicted, so long as the bracket is able to accommodate secure attachment to an implement (and/or an implement bracket) without the need to remove the lower lift arms of the 3-point hitch 110. In the embodiment shown, bracket 200 is attached to the utility vehicle (e.g., the utility vehicle's original frame or other components) using bolts, clamps, screws, welding, or other conventional attachments or connections (not shown). Furthermore, this particular embodiment includes an opening 220 that allows some portion of the rear axle assembly 230 to pass through the opening 220 of the bracket 200.

The utility vehicle bracket 200 depicted in FIG. 3A includes a recess 240 that is adapted to receive a mounting protrusion 410 on the implement bracket 400. The combination of the recess 240 and the mounting protrusion 410, a portion of which rests in the recess 240, serves as a pivot point or axis around which the implement bracket 400 can pivot, rotate, or move when the implement bracket 400, and any implement to which the implement bracket 400 is attached, is positioned so that it can be attached to the utility vehicle bracket 200.

The utility vehicle bracket 200 shown in FIG. 3A includes a second recess 260 that is adapted to receive a second mounting protrusion 420 on the implement bracket 400. In this case, however, the recess 260 serves not as a pivot point, but as: (1) a potential stop for the upward motion of the implement bracket 400 and any implement to which the implement bracket 400 is attached (i.e., the implement bracket 400 cannot be moved upward any further than the depth of the second recess 260; once the second mounting protrusion 420 on the implement bracket 400 rests against the upper-most portion of the second recess 260, then the implement bracket 400 cannot be moved or rotated any higher); and/or (2) a feature that guides the implement bracket 400 as it is moved upward and/or rotated prior to the implement bracket 400 being securely attached to the utility vehicle bracket 200.

The implement bracket 400 includes an opening 430. After the implement bracket 400 has been positioned so that opening 430 substantially aligns with opening 270 on the utility vehicle bracket 200, the implement bracket 400 is securely fastened to the utility vehicle bracket 200 by, for example, inserting a pin (not shown) through both openings 270, 430 and securing the pin. Of course other mechanical connections for securing the brackets 200, 400 may be used. Furthermore, the implement bracket 400 may be securely fastened to the utility vehicle bracket 200 manually, or using a semi-automated or automated assembly. It should be noted, too, that the representative secure connection discussed here, as well as other embodiments, are separate from, and in addition to, any connection with the lower lift arms of the 3-point hitch 110 (or other conventional hitch) associated with the utility vehicle. The combination of the lower lift arms of the 3-point hitch 110 and the lift support 300 engage the implement bracket 400 for the purpose of lifting or moving the implement bracket 400 (and implement to which the implement bracket is attached) so that the implement bracket 400 and associated implement may be securely attached to the utility vehicle bracket 200 at a location other than where the lower lift arms 110 of the 3-point hitch 100 engage the implement bracket 400. The implement bracket 400 also includes a recess 450 that accommodates the lift support 300 attached to the lower lift arms 110 of the 3-point hitch 100.

The utility vehicle bracket 200 also includes an opening 270 through which a bolt or other fastener (not shown) may be inserted once the opening 270 overlays a corresponding opening 430 on the implement bracket 400, thereby helping to securely attach the utility vehicle bracket 200 to the implement bracket 400.

The utility vehicle bracket 200 may be attached to the utility vehicle in various ways, so long as the utility vehicle bracket 200 is rigidly and securely attached to the utility vehicle (e.g., by bolting the utility vehicle bracket 200 to the frame of the utility vehicle). The utility vehicle bracket 200, rather than the 3-point hitch 100 alone, is the assembly by which an implement is attached to the utility vehicle.

The utility vehicle bracket 200 is adapted to provide secure attachment of the implement to the utility vehicle. This typically will be accomplished by mechanical configurations adapted to allow the implement bracket 400 to pivot around some point on the utility vehicle bracket 200. The pivot point described above is located at a position in front of the rear axle 230 of the utility vehicle. Typically such a location is beneficial because as the pivot point or axis is moved toward the front of the utility vehicle (e.g., closer to a location under or near the center of mass of the utility vehicle), the movement or rotation of the implement bracket 400, and any implement to which the implement bracket 400 is attached, about the pivot point or axis is less likely to destabilize the utility vehicle. This is generally true because much of the mass of a utility vehicle is associated with its engine, which is typically located in the front of the vehicle.

Turning now to FIG. 4, an embodiment of an implement bracket 400 in accordance with the invention is attached to an implement, in this case a backhoe, is shown. A first solid tube 415 extends between, and connects, two opposing implement bracket frame portions 440. A second solid tube 425 extends between the two opposing implement bracket frame portions 440, and extends beyond the outer surface of these frame portions 440. In the embodiment shown, first solid tube 415 engages recess 240 on the utility vehicle bracket 200. As discussed above, the combination of the implement bracket 400—and the implement to which the bracket is attached, such as a backhoe pivots where the first solid tube 415 engages recess 240 on the utility vehicle bracket 200. Furthermore, in the embodiment shown, the recess 240 is positioned on the interior of the implement bracket frame portion 440 when it engages the first solid tube 415.

Solid tube 425, on the other hand, engages recess 260 on the exterior of the implement bracket frame portion 440. Alternative configurations are possible without departing from the invention. Solid tube 425 and first solid tube 415 may engage the corresponding recesses 240 and 260 on the same or different sides of the implement bracket frame portion 440 of the implement bracket 400.

Figure 5:
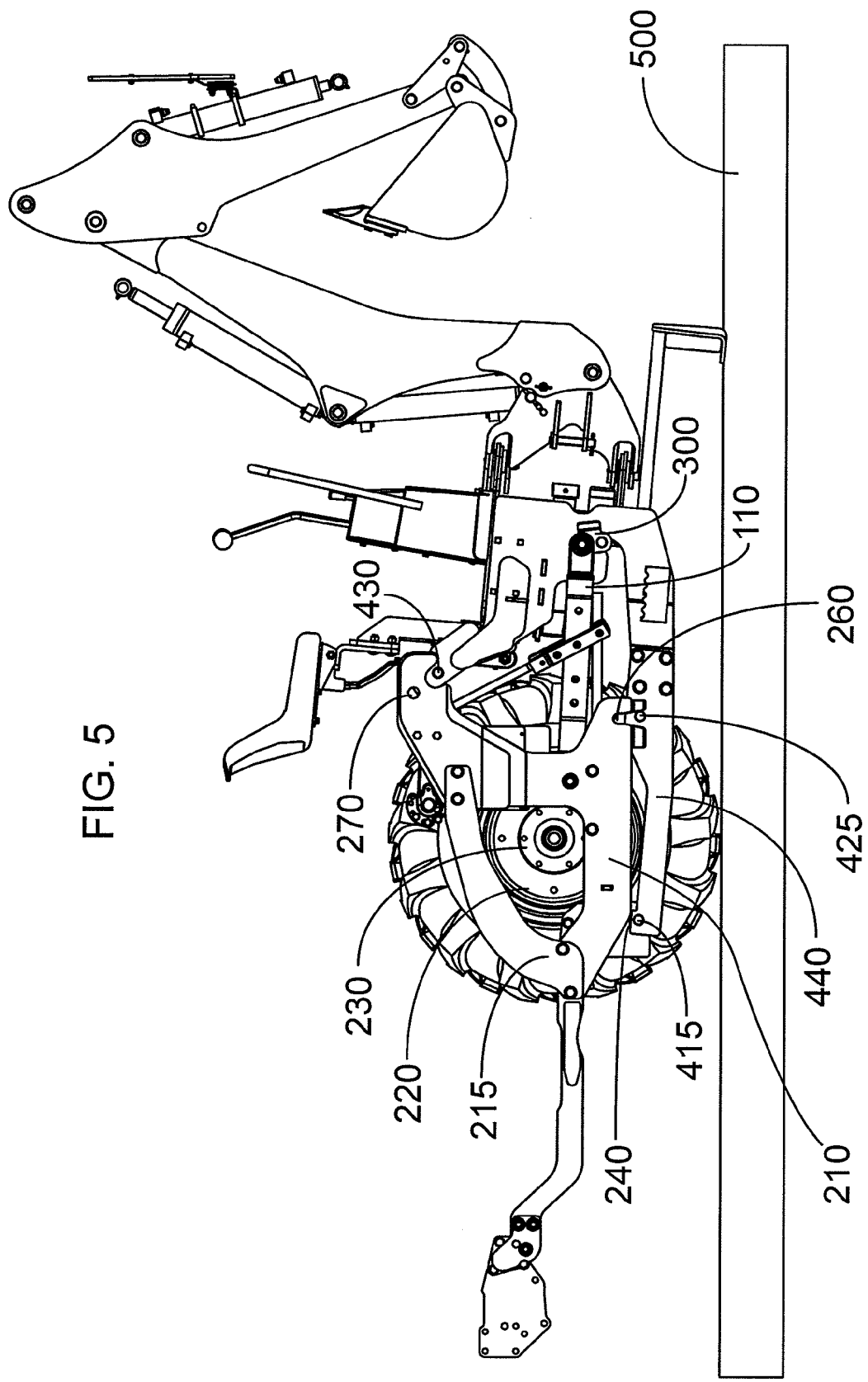
FIG. 5 is a side view of the attachment apparatus of FIG. 3 in position to attach an implement to a utility vehicle.

Turning now to FIG. 5, another side view of one embodiment of an attachment apparatus in accordance with the present invention is shown. In this particular side view, the utility vehicle is positioned such that the utility vehicle bracket 200—which is attached to the utility vehicle—is positioned over the implement bracket 400. In the embodiment shown, solid rods or tubes 415, 425, which connect opposing frame portions of the implement bracket 440, are positioned in, or below, corresponding recesses 240 and 260 on the utility vehicle bracket 200. As discussed above, at least one location corresponding to the engagement between the implement bracket 400 and the utility vehicle bracket 200—depicted here as the location where first solid tube 415 engages recess 240—serves as a pivot point around which the implement bracket 400 moves, rotates, or otherwise follows a path (typically a curvilinear path). In the embodiment shown, the first solid tube 415 in fact engages two recesses 240, one on each of the opposing frame portions 440. Thus, the first solid tube 415 defines a substantially horizontal axis—an axis perpendicular to the longitudinal axis of the utility vehicle—around which the implement bracket 400 moves. Of course other options exist for accommodating rotational or curvilinear motion about a point or axis. For example, and as noted elsewhere, mounting protrusions 410, 420 extending from the frame portions of the implement bracket 440 may be employed to engage recesses 240, 260 on the corresponding utility vehicle bracket 200. Other conventional connections known in the mechanical arts may also be used to provide a pivoting engagement between the implement bracket 400 and the utility vehicle bracket 200.

FIG. 5 also shows a portion of the implement bracket 400 resting on a surface 500 (e.g., a substantially horizontal surface such as a dirt field, concrete pad, asphalt road, or other surface), and not yet positioned so that the implement bracket 400 is securely engaged to the utility vehicle bracket 200. Lift support 300 engages a lift support recess 450. Typically this is achieved by adjusting the position of the combination of the lower lift arms 110 and lift support 300 relative to the position of the lift support recess 450. In the embodiment shown, the perimeter defining the recess 450 and the channel 460 or access to the recess is curvilinear, thus helping to promote movement of the lift support 300 along the channel 460 as the lift support 300 is moved by hydraulic, or gravitational, forces. Furthermore, the channel 460 helps guide the lift support 300 so that, for example, upward movement of the lift support 300 by virtue of hydraulic operation of the lower lift arms 110 helps guide the lift support 300 into, and against, the upward portion of the lift support recess 450.

Figure 6:
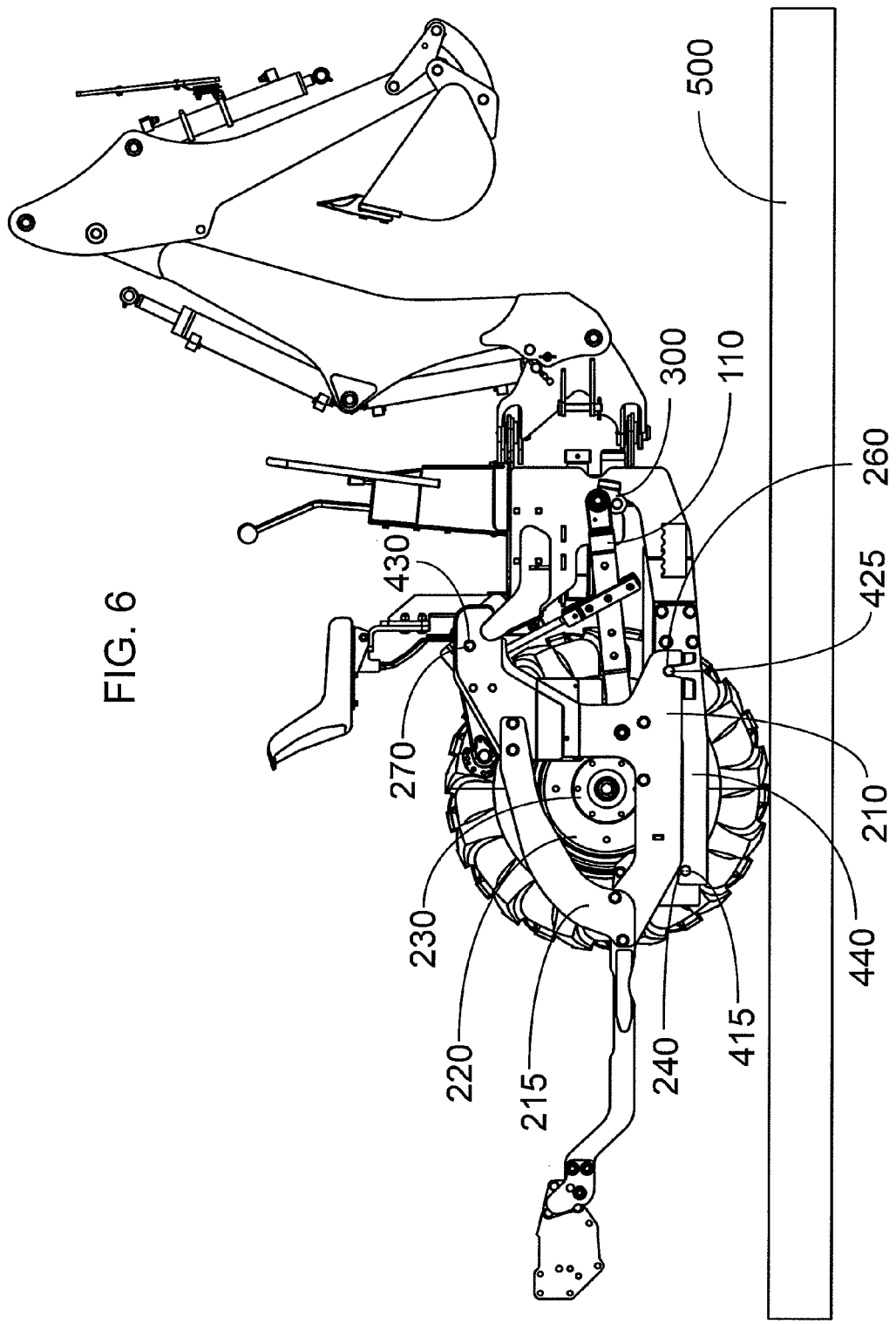
FIG. 6 is a side view of the attachment apparatus of FIG. 3 after the implement is secured to the utility vehicle.

Turning now to FIG. 6, the implement bracket 400, and associated implement—in this case a backhoe, after the implement bracket 400 is securely attached to the utility vehicle bracket 200 is shown. The aforementioned first solid tube 415 of the implement bracket 400 engages recess 240 of the utility vehicle bracket 200. As noted earlier, this engagement serves as a pivot point or pivot axis around which the implement bracket 400 (and any associated implement) moves or pivots when it is lifted, or lowered, by virtue of the motion of the combination of the lower lift arms 110 and lift support 300.

Second solid tube 425 engages recess 260. Typically the shape and depth of recess 260 helps guide upward movement of the implement bracket 400 relative to the utility vehicle bracket 200 such that alignment of opening 270 on the utility vehicle bracket 200 with opening 430 on the implement bracket 400 is facilitated. For example, the depth of recess 260 may be such that second solid tube 425 rests against the upper perimeter of the recess 260 when opening 270 and opening 430 are aligned.

As noted earlier, one method of securely attaching an implement bracket 400 to a utility vehicle bracket 200 is by aligning openings on each of said brackets 200, 400 (e.g., for the representative version shown in FIGS. 3A, 3B, 4, 5, and 6, by aligning openings 270 and 430) so that the brackets 200, 400 can be attached to one another. For example, once the openings 270, 430 are aligned a threaded bolt (not shown) may be inserted through each of the openings 270, 430. Corresponding nuts (not shown) may then be threaded onto each bolt and then, by applying sufficient force, help provide a secure connection between the implement bracket 400 and utility vehicle bracket 200. Alternatively, various kinds of pin assemblies may be used (e.g., cotter pins).

Other conventional mechanical connections known in the art may be also be used to secure the implement bracket 400 to the utility vehicle bracket 200. For example, either the implement bracket 400 or the utility vehicle bracket 200 may include a cylindrical boss adapted to engage a cylindrical recess on the other bracket. Thus, for example, for the embodiment depicted in FIG. 5, the implement bracket 400, rather than comprising an opening 430 may, at the same or similar location, include an inwardly protruding, cylindrically shaped boss adapted to fit into an opening 270 on the utility vehicle bracket. This may be achieved, in part, by providing a rounded upper portion to the boss so that it slips more easily into place. Of course the boss may be placed on the utility vehicle bracket 200, rather than the implement bracket 400, in which case the implement bracket 400 includes an opening adapted to receive the boss. Furthermore, the boss may protrude inwardly (i.e., toward the longitudinal center line of the utility vehicle) or outwardly (i.e., away from the longitudinal center line of the utility vehicle), depending on whether the implement bracket 400, when engaged with the utility vehicle bracket 200, is outside the implement bracket 400 or inside the implement bracket 400.

In some versions of the invention, automated or semi-automated connecting implement is used to help attach the implement bracket 400 to the utility vehicle bracket 200. For example, spring-loaded pins may be deployed once the openings 270, 430 are aligned. That is, rather than an operator manually inserting pins or bolts through the aligned openings 270, 430, an alternative embodiment of the invention may include spring-loaded pin assemblies that are activated once the openings 270, 430 are aligned. Activation of these assemblies (e.g., by pulling a lever or pushing a button), allows the mechanical energy stored in compressed springs to be released, thereby driving pins through the aligned openings 270, 430. The pins, once deployed (i.e., driven through the openings), may be secured further by, for example, inserting cotter pins through a bore in the ends of each of the pins. Of course other sources of energy or combinations of energy may be used to provide the force necessary to drive pins through openings (or to achieve some other form of connection). For example, mechanical, electrical, hydraulic or some combination thereof may be used to help achieve the secure connection between the implement bracket 400 and the utility vehicle bracket 200.

The invention also encompasses methods of attaching an implement to a utility vehicle. One method for attaching an implement to a utility vehicle includes the step of attaching a lift support 300 to the lower lift arms of the 3-point hitch 110. As discussed elsewhere, the lift support 300 is adapted to lift or move an implement so that it can be attached to the utility vehicle at a location other than where the implement engages the combination of the lift support 300 and lower lift arms of the 3-point hitch 110. This may be done through brackets that are attached to a utility vehicle, implement, or both. Alternatively, the original design of the utility vehicle, implement, or both may include mechanical connectors that allow the implement to engage, and connect with, the utility vehicle in a manner generally described herein.

An alternative method for attaching an implement to a utility vehicle includes the step of attaching a lift support 300 to the lower lift arms of the 3-point hitch 110; engaging an implement using the combination of the lift support 300 and lower lift arms of the 3-point hitch 110; and positioning the implement in relation to a utility vehicle so that the implement is attached to the utility vehicle at a location other than where the implement engages the combination of the lift support 300 and lower lift arms of the 3-point hitch 110. As noted earlier, engagement between the utility vehicle and the implement may be accomplished by attaching brackets to the utility vehicle, the implement, or both. Or, alternatively, the original design of the utility vehicle, implement, or both may include mechanical connectors that allow an implement to engage, and connect with, the utility vehicle.

For those utility vehicles and implements to which brackets are attached, a method for attaching an implement to the utility vehicle includes the steps of attaching a utility vehicle bracket 200 to the utility vehicle, the utility vehicle bracket 200 adapted to attach to an implement bracket 400; attaching an implement bracket 400 to the implement; and attaching a lift support 300 to the lower lift arms of a 3-point hitch 110, the combination of the lift support 300 and lower lift arms of a 3-point hitch 110 being adapted to position the implement so that the utility vehicle brackets 200 may be attached to the implement brackets 400.

Brackets may be attached to the implement, utility vehicle, or both in a variety of ways. For example, portions of the bracket may be clamped, bolted, riveted, screwed, fused, welded, adhered, epoxied, or otherwise attached to parts of the utility vehicle or implement.

Note too that the term "bracket" refers to a single unitary piece; pairs of side brackets for attaching to each side of the implement, utility vehicle, or both; or some combination of components, so long as the result is an apparatus by which an implement may be securely attached to a utility vehicle without removing the lower lift arms of a 3-point hitch. Accordingly, in one method, the step of attaching a utility vehicle bracket 200 to the utility vehicle comprises the step of attaching a first utility vehicle side bracket 210 to the utility vehicle and the step of attaching a second utility vehicle side bracket 210 to the utility vehicle. Alternatively, the step of attaching an implement bracket 400 to an implement comprises the step of attaching a first implement side bracket 440 to the implement and the step of attaching a second implement side bracket 440 to the implement.

Other methods may include steps in addition to attaching the utility vehicle bracket 200, implement bracket 400, and lift support 300 as described above. For example, one method also includes the step of lifting the implement with the combination of the lift support 300 and lower lift arms of the 3-point hitch 110. Another version of the present method includes the steps of lifting the implement with the combination of the lift support 300 and lower lift arms of the 3-point hitch 110; and the step of connecting the utility vehicle bracket 400 to the implement bracket 200. For example, as discussed above, the step of connecting the utility vehicle bracket 200 to the implement bracket 400 may comprise aligning openings 230, 470 along with the manual or mechanical insertion of pins through the openings 230, 470. Numerous other conventional, mechanical couplings may be employed, so long as the utility vehicle bracket 200 and implement bracket 400 are securely attached to one another (thereby providing secure attaching of the implement to the utility vehicle).

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An implement connecting apparatus for attaching an implement to a utility vehicle having a three-point hitch, the three-point hitch having two lower lift arms attached to connecting arms that are in turn attached to rockshaft arms, and an adjustable upper link arm, the implement connecting apparatus comprising:
   a utility vehicle bracket adapted to attach to the utility vehicle, the utility vehicle bracket including a plurality of mounting recesses,
   an implement bracket adapted to attach to an implement, the implement bracket including a plurality of mounting tubes,
   the plurality of mounting recesses adapted to engage the mounting tubes to align and secure the implement bracket to the utility vehicle bracket,
   a lift-support adapted to removably attach to the lower lift arms of the three-point hitch,
   the implement bracket further includes a lift-support recess, the lift-support recess adapted to align and engage the lift support, and
   the implement bracket further adapted to removably attach to the utility vehicle bracket thereby removably attaching the implement to the utility vehicle.

2. The connection apparatus of claim 1, wherein the actuation of the lower lift arms positions the implement bracket such that it the utility vehicle bracket may be removably attached to the implement bracket.

3. The connection apparatus of claim 2, wherein the implement bracket is attached to the utility vehicle bracket by self-actuating pins.

4. The connection apparatus of claim 2, wherein the implement bracket is self-aligned to the utility vehicle bracket.

5. A utility vehicle having a three-point hitch, the three-point hitch having two lower lift arms connected to connecting arms that are in turn connected to rockshaft arms, and an adjustable upper link arm, the utility vehicle comprising:
   an implement connecting apparatus formed as part of the utility vehicle, the implement connecting apparatus including a plurality of mounting recesses,
   an implement bracket adapted to attach to an implement, the implement bracket including a plurality of mounting tubes adapted to removably engage with the mounting recesses,
   a lift support adapted to removably attach to the lower lift arms of the three-point hitch, the lift support further adapted to engage the implement bracket, and
   the implement bracket further adapted to removably attach to the implement connecting apparatus to removably attach the implement to the utility vehicle.

6. A method for connecting an implement to a utility vehicle having a 3-point hitch, the 3-point hitch including two lower lift arms and a top link, the method comprising the steps of:
   attaching a utility vehicle bracket to the utility vehicle, the utility vehicle bracket adapted to removably attach to an implement bracket,
   attaching an implement bracket to the implement,
   attaching a lift support to the lower lift arms of a 3-point hitch,
   the combination of the lift support and lower lift arms being adapted to position the implement so that the utility vehicle bracket may be removably attached to the implement bracket,
   lifting the implement with the combination of the lift support and lower lift arms of a 3-point hitch, and
   removably attaching the utility vehicle bracket to the implement bracket.

* * * * *